(12) United States Patent
Seitzer et al.

(10) Patent No.: US 7,823,389 B2
(45) Date of Patent: Nov. 2, 2010

(54) COMPOUND CLEARANCE CONTROL ENGINE

(75) Inventors: Kenneth Edward Seitzer, Cincinnati, OH (US); Wojciech Sak, West Chester, OH (US); Zhifeng Dong, Cincinnati, OH (US); Robert Paul Ziegler, Fort Thomas, KY (US); Chris Charles Glynn, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 1022 days.

(21) Appl. No.: 11/599,834

(22) Filed: Nov. 15, 2006

(65) Prior Publication Data

US 2008/0112798 A1 May 15, 2008

(51) Int. Cl.
*F02C 6/08* (2006.01)
(52) U.S. Cl. .......................................... 60/782; 60/785
(58) Field of Classification Search ............... 60/782, 60/785, 806, 39.091; 415/115, 116, 175
See application file for complete search history.

(56) References Cited

U.S. PATENT DOCUMENTS

| 4,553,901 A | 11/1985 | Laurello |
| 5,205,708 A | 4/1993 | Plemmons et al. |
| 5,281,085 A | 1/1994 | Lenahan et al. |
| 6,487,491 B1 * | 11/2002 | Karpman et al. ............ 701/100 |
| 6,612,114 B1 * | 9/2003 | Klingels ....................... 60/785 |
| 6,960,060 B2 * | 11/2005 | Lee ............................. 415/115 |
| 7,096,673 B2 * | 8/2006 | Little et al. .................. 60/782 |
| 2006/0042266 A1 * | 3/2006 | Albers et al. ................. 60/782 |

OTHER PUBLICATIONS

General Electric Company, "CF6-80C2 Engine Airflow FADEC Control," on sale and in public use in USA for more than one year before Sep. 1, 2006, two pages.
General Electric Company, "GE90-115B Engine Airflow," Jun. 2006, three pages, on sale and in public use in USA for more than one year before Mar. 29, 2010.

* cited by examiner

*Primary Examiner*—William H Rodriguez
*Assistant Examiner*—Andrew Nguyen
(74) *Attorney, Agent, or Firm*—William S. Andes; Francis L. Conte

(57) ABSTRACT

A gas turbine engine includes a compressor, combustor, and turbine having a row of blades mounted inside a surrounding turbine shroud. A heat exchanger is used for cooling pressurized air bled from the compressor. A distribution network joins the heat exchanger to the turbine for selectively channeling air from the heat exchanger below the blades and above the shroud for controlling blade tip clearance.

24 Claims, 3 Drawing Sheets

COMPOUND CLEARANCE CONTROL ENGINE

BACKGROUND OF THE INVENTION

The present invention relates generally to gas turbine engines, and, more specifically, to active clearance control therein.

In a gas turbine engine, air is pressurized in a compressor and mixed with fuel in a combustor for generating hot combustion gases. Energy is extracted from the gases in a high pressure turbine (HPT) which is joined by one drive shaft to the compressor.

In a typical turbofan aircraft engine, a fan is mounted upstream from the compressor and is powered by a low pressure turbine (LPT) mounted downstream of the HPT. In marine and industrial (M & I) applications, the LPT powers an external drive shaft for powering a propulsion system or electrical generator in typical applications.

The compression and combustion cycles introduce energy into the pressurized air, with energy extracted from the combustion gases in the turbine stages. Since the HPT is subject to the hottest combustion gases discharged from the combustor, the various components thereof are typically cooled by bleeding a portion of the pressurized air from the compressor. Any air used for turbine cooling is lost from the combustion cycle and therefore reduces overall efficiency of the engine.

Furthermore, each turbine stage includes a row of turbine rotor blades extending radially outwardly from a supporting rotor disk, with the radially outer tips of the blades being mounted inside a surrounding turbine shroud. The shroud is stationary and supported from a surrounding annular turbine case for maintaining a small radial clearance or gap therebetween.

The turbine blades share a common airfoil profile which is optimized for maximizing the efficiency of energy extraction from the combustion gases. Leakage of the combustion gases at the blade tip gaps further decreases efficiency of the engine.

Accordingly, the radial blade tip clearance is made as small as practical but cannot be too small or undesirable rubbing of the blade tips against the turbine shroud can lead to undesirable damage or shortened component life.

Although the blade tip clearance has an initial magnitude when the engine is cold, the size of the gap or clearance will change as the engine is operated and the various components of the turbine are heated or cooled to different temperatures.

Furthermore, as the engine is operated through various levels of power, the turbine components thermally expand and contract which correspondingly affects the size of the blade tip clearance. Since the turbine blades are directly exposed to the hot combustion gases during operation, they are heated quickly and expand radially outwardly toward the surrounding turbine shroud.

Correspondingly, the turbine shroud is a stationary component supported from the surrounding case and therefore has a different rate of thermal expansion and contraction than the turbine blades mounted on their supporting rotor disk.

The typical turbofan aircraft engine initially operates at a low power, idle mode and then undergoes an increase in power for takeoff and climb operation. Upon reaching cruise at the desired altitude of flight, the engine is operated at lower, or intermediate power setting. The engine is also operated at lower power as the aircraft descends from altitude and lands on the runway, following which thrust reverse operation is typically employed with the engine again operated at high power.

In the various transient modes of operation of the engine where the power increases or decreases, the turbine shroud and blades expand and contract differently, which in turn affects the blade clearance. In one particularly problematic mode of operation called reburst, engine power is quickly increased which correspondingly causes the turbine rotor blades to expand radially outwardly at a greater rate than that of the surrounding turbine shroud. The radial clearance therebetween will therefore decrease during this transient phase.

And, in order to avoid undesirable blade tip rubs against the turbine shroud the initial blade tip clearance must be set sufficiently large, which as indicated above will decrease overall efficiency of the engine due to blade tip leakage.

In order to better control the variable blade tip clearance during engine operation, various clearance control configurations are known, including active clearance control (ACC). In active clearance control, relatively cool fan air or relatively hot compressor bleed air, or a mixture thereof, are channeled to the turbine case from which the shrouds are suspended. The case is either heated or cooled as required to minimize the blade tip clearance specifically during cruise operation of the aircraft where maximum efficiency is desired.

Nevertheless, the effectiveness of conventional active clearance control systems is limited and still requires a relatively large nominal blade tip clearance to avoid undesirable tip rubs, particularly during the reburst condition.

Furthermore, the HPT blades are also typically cooled using a portion of the compressor discharge pressure (CDP) air bled from the last stage of the compressor. The air is suitably channeled through internal cooling channels inside the hollow blades and discharged through the blades in various rows of film cooling holes from the leading edge and aft therefrom, and also typically including a row of trailing edge outlet holes or slots on the airfoil pressure side. This blade cooling air bypasses the combustion process and therefore further reduces efficiency of the engine.

Accordingly, it is desired to provide a gas turbine engine having improved active clearance control and efficiency.

BRIEF DESCRIPTION OF THE INVENTION

A gas turbine engine includes a compressor, combustor, and turbine having a row of blades mounted inside a surrounding turbine shroud. A heat exchanger is used for cooling pressurized air bled from the compressor. A distribution network joins the heat exchanger to the turbine for selectively channeling air from the heat exchanger below the blades and above the shroud for controlling blade tip clearance.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
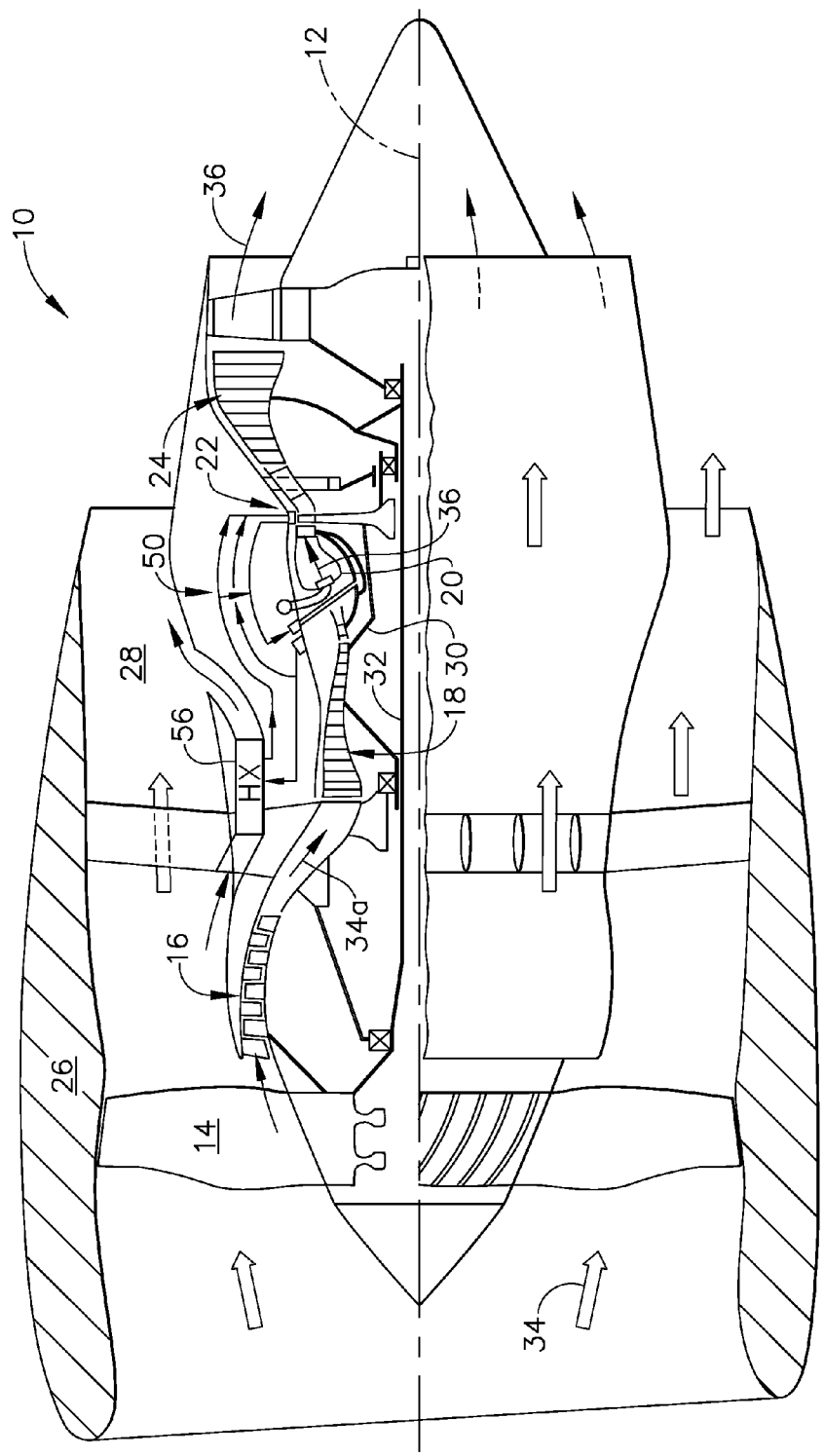
FIG. 1 is an axial sectional schematic view of an exemplary turbofan aircraft gas turbine engine.

Illustrated schematically in FIG. 1 is an exemplary turbofan aircraft gas turbine engine 10. The engine is axisymmetrical about a longitudinal or axial centerline axis 12 and is suitably mounted to the wing or a fuselage of an aircraft (not shown) for powering an aircraft in flight in an exemplary application.

The engine includes in serial flow communication a fan 14, a low pressure or booster compressor 16, a high pressure (HP) compressor 18, an annular combustor 20, a high pressure turbine (HPT) 22, and a low pressure turbine (LPT) 24.

An annular nacelle 26 surrounds the fan 14 and defines an annular bypass duct 28 extending aft around the booster compressor 16. A first drive shaft 30 joins the HPT 22 to the HP compressor 18, and a second drive shaft 32 joins the LPT 24 to the fan 14 and booster compressor 16. The two drive shafts are suitably mounted in bearings in corresponding frames within the engine in a conventional configuration of the various engine components described above.

During operation, ambient air 34 enters the inlet of the engine and is pressurized in part by the fan 14 and discharged through the bypass duct 28 for providing a majority of propulsion thrust. Some of the air 34a passing the fan enters the booster compressor 16 and undergoes a further compression cycle in the multiple axial stages thereof, with additional compression also being provided in the HP compressor 18 in the multiple axial stages thereof.

The pressurized air 34a is discharged from the compressor and suitably mixed with fuel in the combustor 20 for generating hot combustion gases 36. Energy is extracted from the combustion gases 36 in the HPT 22 to drive the first shaft 30 and power the HP compressor 18. Additional energy is extracted from the combustion gases in the LPT 24 to drive the second shaft 32 and power the fan 14 and booster compressor 16.

The engine as described above is conventional in configuration and operation and includes multiple compression stages and multiple turbine stages. For example, the booster compressor 16 may have four axial stages. The HP compressor 18 may include seven axial stages for example. And, the HPT 22 is preferably a single stage turbine followed in turn by an exemplary five stage LPT 24.

Figure 2:
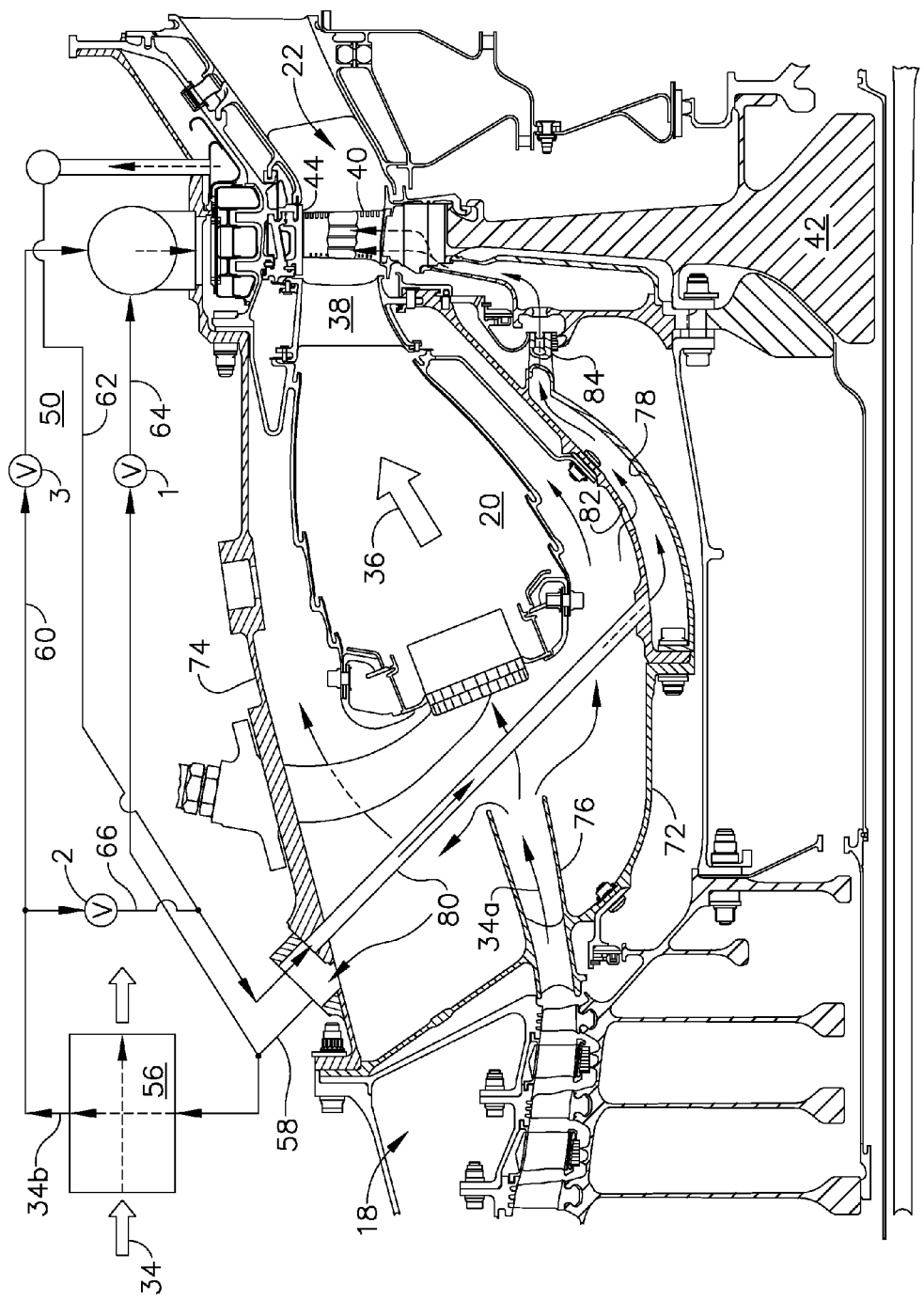
FIG. 2 is an enlarged, partly schematic, view of a portion of the core engine illustrated in FIG. 1 including an active clearance control system therein.

FIG. 2 illustrates in more detail the basic core engine including the high pressure compressor 18, annular combustor 20, and HPT 22 disposed in serial flow communication.

The HPT 22 includes a first stage or HP turbine nozzle having a row of stator vanes 38 suitably mounted in outer and inner bands. Following the vanes is a single row of HP turbine blades 40 removably mounted to the perimeter or rim of a first stage or HP rotor disk 42. The disk 42 is fixedly joined to the first drive shaft 30 which in turn is fixedly joined to the rotor disks supporting the compressor blades of the high pressure compressor 18.

The configuration and operation of the HP compressor 18 and the HPT 22 are conventional for pressurizing the air 34 and expanding the subsequent combustion gases 36 for extracting energy therefrom. In particular, the pressure and temperature of the air 34 increases axially in turn as the air flows downstream through the seven stages of compressor blades. The seventh row of compressor blades defines the last stage of the compressor in this exemplary configuration and discharges the pressurized air at a maximum pressure and a correspondingly high temperature associated with the compressor discharge pressure (CDP) air 34a.

Figure 3:
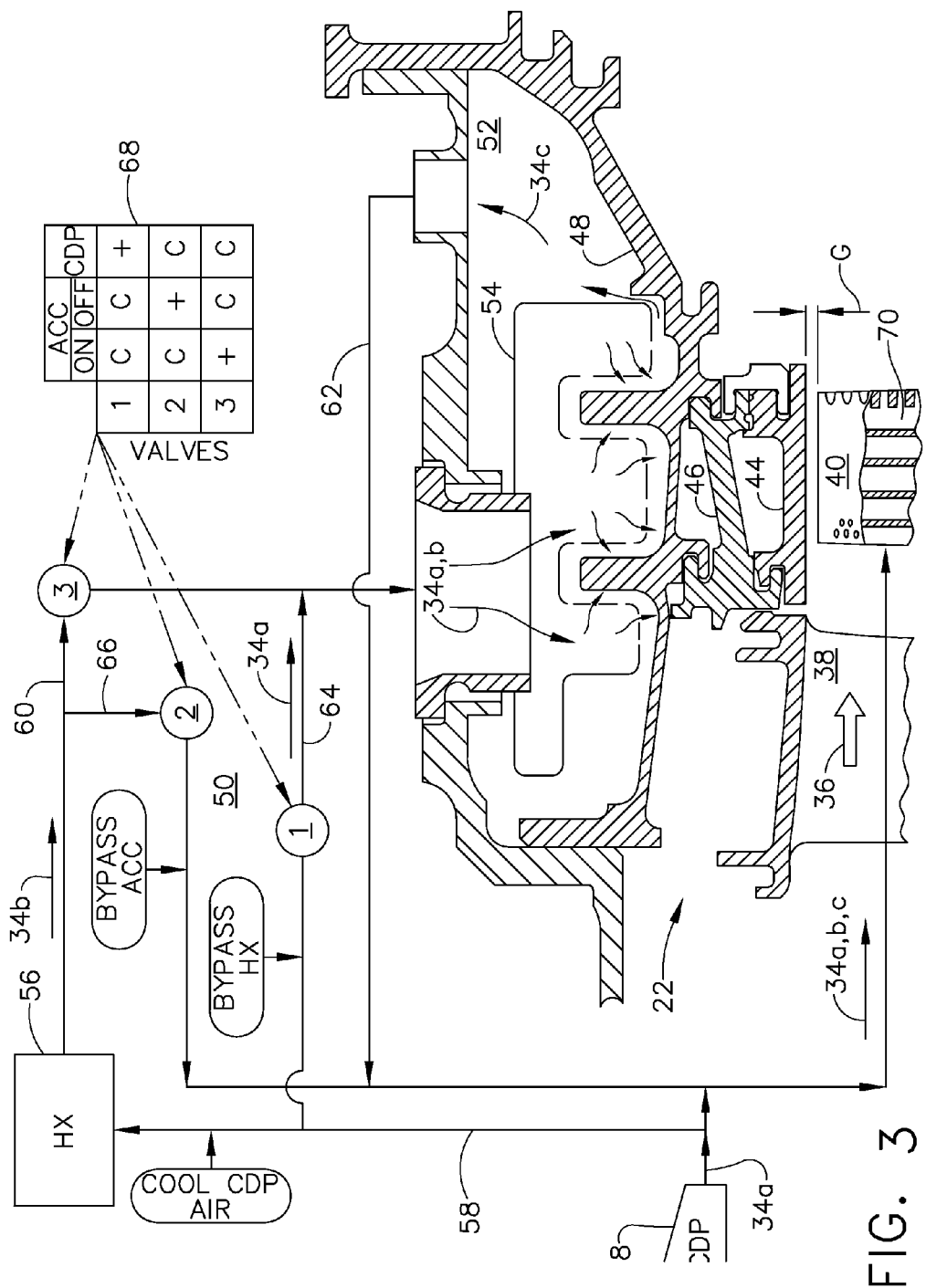
FIG. 3 is an enlarged schematic view of the clearance control system illustrated in FIG. 2.

FIG. 3 shows in more detail the typical location of the radially outer tips of the turbine blades 40 mounted radially inside a surrounding turbine shroud 44. The shroud is typically formed in circumferential segments, with a row of the discrete turbine shrouds 44 being suitably suspended from a supporting annular hanger 46, also formed in segments.

The hanger in turn is conventionally mounted to a portion of the surrounding annular turbine casing or case 48 which has a pair of radial ribs or rails spaced between forward and aft mounting flanges.

In this way, the row of turbine shrouds 44 is mounted stationary in the engine and surrounds the radially outer tips of the row of rotary turbine blades 40, and spaced therefrom to define a relatively small radial clearance or gap G having an initial or nominal size.

As indicated above, leakage of the combustion gases 36 through the gap G during operation correspondingly reduces efficiency of the turbine and the engine. And, differential thermal expansion and contraction of the turbine blades 40 mounted on their supporting rotor disk and the suspended turbine shrouds 44 change that nominal radial clearance during the various modes of operation of the engine from takeoff to cruise at elevation and to landing on the runway.

FIGS. 2 and 3 illustrate schematically an active clearance control (ACC) system 50 which is selectively used to cool or heat the turbine case 48 that supports the row of turbine shrouds 44. The turbine case 48 itself therefore defines an ACC mount that supports the hanger 46 and shrouds 44 in turn to control the size of the radial tip clearance or gap G.

In particular, the HP turbine 22 includes an annular supply manifold or plenum 52 which surrounds the turbine case 48. An annular impingement baffle 54 is suitably mounted inside the plenum 52 and has serpentine portions which closely match the outer profile of the two radial rails of the case 48.

In this way, relatively cool or hot air may be channeled through the impingement baffle 54 to provide discrete jets of impingement air over the outer surface of the two rails which in turn affects the radial expansion and contraction thereof and the corresponding size of the radial tip gap G during operation. This portion of the HPT may have any conventional configuration and shape for controlling the size of the radial gap G, but is modified as described hereinbelow below for enhanced performance.

The ACC system 50 is initially illustrated in FIG. 1 installed inside the cowling of the core engine, with an air-to-air heat exchanger (HX) 56 suitably mounted in flow communication with the annular bypass duct 28. The heat exchanger itself may have any conventional configuration and includes a primary circuit through which the relatively cold fan air 34 is channeled for cooling the hot CDP air 34a in an independent, secondary circuit therein.

As shown in FIG. 2, this secondary circuit of the heat exchanger 56 is suitably joined by an inlet circuit 58 to the discharge end of the compressor 18 in flow communication therewith for channeling a portion of the compressor discharge air 34a through the heat exchanger wherein it is cooled by the bypass fan air 34 channeled through the primary circuit.

A compound distribution network is disposed in flow communication with the HX 56 for selectively channeling or distributing the cooled CDP air 34b from the HX 56 to the HPT 22 both below and inside the first stage blades 40 for cooling thereof as well as above and outside the row of turbine shrouds 44 for actively controlling the magnitude or size of the radial clearance or gap G. In this way, the same or common compressor discharge air 34a may be used for both active clearance control and blade cooling in a compound ACC system for significantly enhancing engine performance and efficiency.

FIGS. 2 and 3 illustrate in part schematically the compound distribution network which includes a first circuit 60, a second circuit 62, a first bypass 64, and a second bypass 66. These network components may have any conventional flow channeling configurations such as tubes or conduits and manifolds for collecting, channeling, and distributing the compressor discharge air to the different turbine components with controlled flow.

The first circuit 60 is joined in flow communication from the discharge end of the secondary circuit in the heat exchanger 56 to the turbine case 48 for channeling the cooled compressor discharge air 34b thereto.

The second circuit 62 is joined in flow communication from the turbine case 48 to the first stage turbine blades 40 for channeling the spent cooling air 34c to the blades themselves for cooling thereof.

In particular, the second circuit 62 is suitably joined in flow communication with the plenum 52 which surrounds the turbine case 48 and encloses the impingement baffle 54 for collecting the spent impingement air 34c from outside the case 48 for subsequent or compound use in cooling the turbine blades 40.

The first bypass 64 is joined in flow communication from the discharge end of the compressor 18 directly to the turbine case 48 to bypass completely the heat exchanger 56 and provide the hot CDP air 34a directly to the case. The first bypass 64 may be joined to the inlet circuit 58 leading to the heat exchanger, or may be separately joined to the compressor discharge in any suitable manner for reducing the number of components, size, and weight.

The second bypass 66 is joined in flow communication from the outlet of the secondary circuit in the heat exchanger 56, in a portion of the first circuit 60 for example, to a suitable intermediate location in the second circuit 62 to bypass the turbine case 48 and provide the cooled compressor discharge air 34b directly to the second circuit for cooling the first stage blades 40.

In order to control and regulate the flow through the various conduits of the distribution network, the first bypass 64 includes a corresponding first control valve 1, the second bypass 66 includes a corresponding second control valve 2, and the first circuit 60 includes a corresponding third control valve 3 joined in serial flow communication in the corresponding flow conduits thereof.

The three valves 1,2,3 may have any conventional configuration such as electrically operated valves independently controlled by an electrical controller 68 of the engine as illustrated schematically in FIG. 3. The controller 68 may be a separate computer or may be a portion of the main control computer of the engine suitably configured in software for controlling the three valves 1-3 in the conventional manner of controlling other valves typically found in the engine.

The first valve 1 is joined in the first bypass circuit 64 for selectively varying or controlling the bypass flow of the hot compressor discharge air 34a to the turbine case.

The second valve 2 is joined in the second bypass circuit 66 for selectively controlling or varying the bypass flow of the cooled compressor discharge air 34b from the heat exchanger 56 directly to the turbine blades 40.

And, the third valve 3 is joined in the first flow circuit 60 for selectively controlling or varying the flow of the cooled compressor discharge cooling air 34b directly to the turbine case.

As indicated above in reference to FIG. 3, the HPT 22 includes the annular plenum 52 surrounding the turbine case 48, with the cooperating impingement baffle 54 disposed therein for effecting active clearance control of the blade tip clearance G. In particular, the impingement baffle 54 is joined in flow communication with the outlet end of the first circuit 60 for receiving the compressor discharge air therefrom which is then channeled through the impingement holes in the baffle 54 for impinging this air against the outer surface of the turbine case 48, and in particular around the two control rails thereof to control radial expansion and contraction of the turbine case 48, and thereby control the magnitude of the radial clearance G during operation.

It is noted that the impingement baffle 54 is joined in flow communication with the first circuit 60 for receiving the cooled compressor discharge air 34b, and is also disposed in flow communication with the first bypass 64 for receiving the uncooled, or originally hot compressor discharge air 34a. The two control valves 1,3 control the relative amounts of the hot and cooled discharge air 34a,b to control their thermal affect on the turbine case 48. The spent impingement air from the turbine case 48, which is designated 34c, is collected inside the plenum 52 and channeled through the second circuit 62 to the row of turbine blades 40.

As shown in part in FIG. 3, the blades 40 themselves may have any conventional configuration and typically include internal cooling channels 70 extending the full radial span thereof, with corresponding inlets in the base ends of the mounting dovetails thereof which are suitably joined in flow communication with the second circuit 62.

First stage turbine rotor blades, like the blades 40, are commonly cooled by directly 13 using the hot compressor discharge air 34a, which nevertheless is still cooler than the combustion gases flowing outside the blades themselves. The spent ACC air 34c is much cooler than the original hot CDP air 34a and provides additional advantages in cooling the row of turbine blades.

The controller 68 illustrated in FIG. 3 is operatively joined to the three valves 1,2,3 and is configured in suitable software for adjusting flow through those three valves and their corresponding flow circuits in three different and preferred modes of operation which respectively favor or prefer flow through different ones of the three valves with relatively high or maximum flow, with the other two valves having relatively low or minimum flow.

More specifically, FIG. 3 illustrates the preferred configuration of the controller 68 for effecting a method of using the turbofan engine 10 illustrated in FIG. 1 for active clearance control of the first stage turbine blade tip clearance or gap G in compound combination with corresponding cooling of the first stage blades 40 themselves.

The method begins by initially bleeding a portion of the hot compressor discharge air 34a from the compressor to the heat exchanger 56, which in turn cools the hot discharge air 34a and forms the cooled discharge air 34b. As shown in FIGS. 1 and 2, the initially cool fan air 34 is suitably channeled through the heat exchanger 56 and provides the heat sink that removes heat from the hot CDP air 34a inside the heat exchanger 56.

The three valves may each be operated from relatively closed (C) positions completely or mostly interrupting flow therethrough with zero or low flow rates to relatively open or positive (+) positions having relatively high or maximum flow rates therethrough. The relatively open and closed positions of the three valves may be used to define three corresponding modes of operation for the turbofan engine.

More specifically, a first mode of operation may be defined by substantially fully opening the first valve 1 while substantially closing the second and third valves 2,3 for correspondingly heating the turbine case 48 using the hot CDP air 34a delivered through the first bypass 64. This is the CDP air mode.

In a second mode of operation, the second valve 2 is instead substantially fully open, with the first and third valves 1,3 being substantially closed to bypass airflow to the turbine case 48, and instead channel the cooled CDP air 34*b* to the turbine blades. This is the ACC-OFF mode.

And, a third mode of operation is defined by substantially fully opening the third valve 3 while both the first and second valves 1,2 are substantially closed to channel the cooled CDP air 34*b* to the turbine case 48 for cooling thereof. This is the ACC-ON mode.

The first, or CDP air mode may be used in reburst or re-acceleration operation of the engine to channel the hot CDP air 34*a* through the impingement baffle 54 to quickly heat the turbine case 48 and increase the rate of thermal expansion thereof. In reburst, the hot combustion gases 36 are quickly heating the turbine blades 40 which expand radially outwardly toward the surrounding shrouds 44, but the fast heating of the supporting turbine case 48 correspondingly moves the turbine shrouds radially outwardly to avoid or reduce the likelihood of an undesirable tip rub. This benefit is new to turbofan engines and has not been previously possible in conventional active clearance control systems which lack this increased thermal response capability.

Correspondingly, typical active clearance control is effected only during intermediate power operation of the engine at aircraft cruise. Accordingly, the third or ACC-ON mode of operation may be used during cruise, as well as climb, for example to channel the cooled CDP air 34*b* from the heat exchanger to the impingement baffle 54 for cooling the turbine case 48 and thermally contracting the diameter of the row of turbine shrouds 44 to decrease the radial clearance G for improving cruise efficiency.

And, the second or ACC-OFF mode of operation may be used during engine idle, or takeoff, or decel to bypass the cooled CDP air 34*b* around the shroud mounting case 48 directly to the blades 40 for cooling thereof. Little or no airflow 34*b* is therefore provided through the impingement baffle 54 during ACC-OFF operation.

Since the three control valves 1,2,3 are fully adjustable over an entire range of flowrates from zero to maximum, they may be used as desired for optimizing the control of the various flow circuits in the ACC system 50 for both effecting active clearance control of the turbine shrouds 44 in combination with cooling of the first stage turbine rotor blades 40 themselves.

Accordingly, the three valves may be used for correspondingly adjusting flow of the cooled CDP air 34*b* from the heat exchanger 56 to the mounting case 48, and from the heat exchanger 56 bypassing that mounting case 48; and adjusting the hot CDP air 34*a* from the compressor 18 bypassing the heat exchanger 56 in at least the three different modes of operation described above including ACC on and off.

Many benefits accrue from the ACC system 50 described above with its compound or dual use of the same compressor discharge air 34*a*, both cooled and uncooled, in the ACC mounting of the turbine shrouds 44 and the internal and external cooling of the first stage turbine rotor blades 40.

The fundamental benefit of the ACC system is a substantial increase in performance and efficiency of the engine along with a significant reduction of specific fuel consumption (SFC) notwithstanding the additional hardware and weight required to implement the system.

Since compressor discharge air 34*a* is now used for active clearance control, that air is denser than interstage bleed air or fan air and correspondingly increases heat transfer between the impingement baffle 54 and the turbine case 48, along with an increased thermal response rate of the case 48 and the row of turbine shrouds 44 suspended therefrom.

Furthermore, by cooling the compressor discharge air 34*a* in the heat exchanger 56 the density of the cooled air is even greater for further increasing heat transfer capability and thermal response.

The improved performance of the cooled CDP air correspondingly allows for a reduction of the total flowrate of the CDP air which must be bled away from the compressor for use in active clearance control and turbine blade cooling. Reducing this bleed air correspondingly increases efficiency of the engine since more air is now available for combustion in the combustor 20.

Conventional active clearance control and turbine blade cooling are independent from each other, and use different bleed circuits with correspondingly different flow rates required therefor. Correspondingly, CDP air typically provided for blade cooling is not conventionally cooled.

In contrast, the compound distribution network disclosed above uses the same compressor discharge air 34*a* both for active clearance control and for blade cooling, which correspondingly increases the volume or flowrate of air available in the clearance control system not previously available.

Accordingly, the cooled CDP air provides substantial advantages in both the active clearance control system and the turbine blade cooling not previously possible and therefore provides synergy in the compound or multiple use of the same compressor discharge air for the multiple functions described above.

As indicated above, the first bypass circuit 64 permits the new use of the hot CDP air 34*a* in the distribution network to quickly heat the turbine case 48 and increase its thermal-response rate and decrease response time. This is particularly important in reburst operation which conventionally requires the use of a relatively large tip gap G of about 0.25 mm to prevent undesirable blade tip rubs.

In contrast, the improved performance of the ACC system disclosed above permits a substantial reduction of about half of the nominal blade tip clearance G to about 0.13 mm during normal operation of the engine. This smaller gap or clearance is now sufficient to accommodate reburst operation since the turbine shroud may thermally expand at a substantially higher rate than previously possible and better match the fast thermal expansion of the turbine rotor blades to prevent undesirable tip rubbing therebetween.

This smaller running clearance of the turbine blades correspondingly reduces combustion gas leakage therepast during operation and therefore further increases turbine efficiency and engine performance. The smaller clearance will also lead to a reduction in exhaust gas temperature (EGT) which has corresponding benefits including increased time of the engine on wing.

The compound ACC system 50 illustrated in the three Figures may be created using conventional components in a compact assembly inside the core engine cowling for reducing space and weight requirements thereof. For example, the air-to-air heat exchanger 56 may be conveniently disposed inside the core cowling at the base of the struts supporting the fan nacelle 26 in suitable flow communication with the bypass duct 28. A suitable inlet scoop may be provided in the core cowl for receiving a portion of the fan air which is channeled aft through the primary circuit of the heat exchanger and through an outlet channel returning the air to the bypass duct prior to the fan outlet at the trailing edge of the nacelle.

The core engine illustrated in FIG. 2 includes radially inner and outer combustor casings 72,74 which surround the combustor 20 both radially inwardly and outwardly thereof in full annular rings and are joined together at the forward ends to a conventional annular diffuser 76. The diffuser is located at the outlet end of the compressor 18 and diffuses the compressor discharge air 34a into the plenum surrounding the annular combustor 20.

The second flow circuit 62 preferably includes an annular mixing chamber 78 suitably mounted below the inner casing 72. A plurality of circumferentially spaced apart transfer tubes 80 extend radially through the inner and outer casing 72,74 in flow communication with the mixing chamber 78 to return thereto the compressor discharge air initially channeled to the HX 56 and the turbine case 48.

The inner casing 72 also includes a row of mixing holes 82 suitably located along the mixing chamber 78 to provide directly thereto some of the hot CDP air 34a. The hot CDP air will then mix with the cooler return air 34c in the chamber 78 to prevent over-cooling of the turbine blades 40.

The second circuit 62 further includes an annular flow inducer 84 disposed in flow communication between the outlet end of the chamber 78 and the row of first stage turbine rotor blades 40 extending radially outwardly from their supporting rotor disk. The flow inducer 84 is a stationary component including a row of vanes which tangentially accelerate flow to the rotating first stage rotor disk 42. This is a conventional component for efficiently channeling pressurized air to the axial dovetail slots of the disk 42 for flow into the inlets found in the dovetails of the turbine blades 40.

The cooling air flows radially outwardly through the blades 40 and the cooling channels 70 therein and is discharged through the several rows of outlet holes in the pressure and suction sides of the blade airfoil in a conventional manner.

Accordingly, conventional features may be used for cooling the first stage turbine rotor and blades thereon and in the ACC system for mounting the turbine shrouds 44 to the supporting or mounting case 48, with suitable modifications to introduce the compound distribution network and cooperating heat exchanger.

In one exemplary configuration analyzed, the ACC system 50 may be introduced into the turbofan engine with a relatively small increase in weight thereof, yet can have a substantial increase in performance and efficiency of the engine with a correspondingly significant reduction in SFC.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. A gas turbine engine comprising:
a fan mounted inside a nacelle in serial flow communication with a compressor, combustor, high pressure (HP) turbine powering said compressor, and a low pressure turbine powering said fan;
said HP turbine including a row of turbine rotor blades mounted inside a surrounding turbine shroud, with a radial gap therebetween;
a heat exchanger disposed in a fan bypass duct inside said nacelle in flow communication with said compressor for using fan air to cool pressurized discharge air from said compressor; and
a distribution network disposed in flow communication with said heat exchanger, and including a plurality of valves for selectively distributing said compressor air to said HP turbine both outside said shroud and inside said blades.

2. An engine according to claim 1 further comprising:
an active clearance control (ACC) mount supporting said shroud around said blades;
said network having a first circuit joining said heat exchanger to said mount, and a second circuit joining said mount to said blades; and
a controller operatively joined to said valves in said network for adjusting flow of said compressor air through said first and second circuits.

3. An engine according to claim 2 wherein said network further comprises:
a first bypass joined in flow communication from said compressor to said mount to bypass said heat exchanger; and
a second bypass joined in flow communication from said heat exchanger to said second circuit to bypass said mount.

4. An engine according to claim 3 wherein:
said first bypass includes a first valve in serial flow communication therein for selectively controlling bypass flow therethrough;
said second bypass includes a second valve in serial flow communication therein for selectively controlling bypass flow therethrough; and
said first circuit includes a third valve in serial flow communication therein for selectively controlling flow therethrough.

5. An engine according to claim 4 wherein said controller is operatively joined to said first, second, and third valves and configured for adjusting flow therethrough in three different modes of operation respectively favoring flow through different ones of said three valves.

6. An engine according to claim 5 wherein said mount comprises:
an annular case supporting a row of said turbine shrouds around said blades; and
a plenum surrounding said case, and having an impingement baffle therein disposed in flow communication with said first circuit for impinging said air against said case to control radial expansion thereof.

7. An engine according to claim 6 wherein said blades include internal cooling channels disposed in flow communication with said second circuit, and said second circuit is joined in flow communication with said plenum for collecting spent impingement air from said case for flow to said blades.

8. An engine according to claim 7 further comprising:
inner and outer combustor casings surrounding said combustor; and
said second circuit includes a mixing chamber mounted below said inner casing, and a plurality of transfer tubes extending radially through said inner and outer casings in flow communication with said chamber.

9. An engine according to claim 7 further comprising:
a diffuser disposed at the outlet of said compressor for diffusing compressor discharge air into said combustor, and joined to said heat exchanger; and
a flow inducer disposed in said second circuit in flow communication between said chamber and blades for channeling air thereto.

10. A method of using said engine according to claim 7 comprising:
opening said first valve in a first mode of operation for heating said case;

opening said second valve in a second mode of operation to bypass said case; and opening said third valve in a third mode of operation to effect active clearance control of said gap by impinging air on said case.

11. A gas turbine engine comprising:

a compressor, combustor, and high pressure turbine disposed in serial flow communication;

said turbine including a row of turbine rotor blades mounted inside a surrounding turbine shroud, with a radial gap therebetween;

a heat exchanger disposed in flow communication with said compressor for cooling pressurized air therefrom; and a compound distribution network disposed in flow communication with said heat exchanger and including valves for selectively distributing said cooled air to said turbine both below and inside said blades and above and outside said shroud for controlling magnitude of said radial gap.

12. An engine according to claim 11 wherein:

said turbine further includes an annular case supporting a row of said turbine shrouds around said blades; and said network includes a first circuit joined in flow communication from said heat exchanger to said case for channeling said cooled air thereto, and a second circuit joined in flow communication from said case to said blades for channeling said air thereto.

13. An engine according to claim 12 wherein said network further comprises:

a first bypass joined in flow communication from said compressor to said case to bypass said heat exchanger; and a second bypass joined in flow communication from said heat exchanger to said second circuit to bypass said case.

14. An engine according to claim 13 wherein:

said first bypass includes a first valve in serial flow communication therein for selectively controlling bypass flow therethrough;

said second bypass includes a second valve in serial flow communication therein for selectively controlling bypass flow therethrough; and said first circuit includes a third valve in serial flow communication therein for selectively controlling flow therethrough.

15. An engine according to claim 14 further comprising a controller operatively joined to said first, second, and third valves and configured for adjusting flow therethrough in three different modes of operation respectively favoring flow through different ones of said three valves.

16. An engine according to claim 14 wherein:

said turbine further includes a plenum surrounding said case, and having an impingement baffle therein disposed in flow communication with said first circuit for impinging said air against said case to control radial expansion thereof; and said blades include internal cooling channels disposed in flow communication with said second circuit for cooling said blades.

17. An engine according to claim 16 wherein said second circuit is joined in flow communication with said plenum for collecting said spent impingement air from said case.

18. An engine according to claim 14 further comprising:

a fan mounted inside a nacelle forward of said compressor and joined to a low pressure turbine following said high pressure turbine;

said nacelle being spaced from said compressor to define a fan bypass duct therearound; and said heat exchanger is disposed in flow communication with said bypass duct for channeling fan air thereto to cool said compressor air.

19. An engine according to claim 14 further comprising:

inner and outer combustor casings surrounding said combustor; and said second circuit includes a mixing chamber mounted below said inner casing, and a plurality of transfer tubes extending radially through said inner and outer casings in flow communication with said chamber.

20. An engine according to claim 19 wherein said second circuit further includes:

a plurality of mixing holes disposed in said inner casing in flow communication between said compressor and chamber; and an annular flow inducer disposed in flow communication between said chamber and blades for channeling air thereto.

21. A method for effecting active clearance control (ACC) in a turbofan engine including in serial flow communication a fan, compressor, combustor, high pressure (HP) turbine, and a low pressure turbine comprising:

cooling hot discharge air from said compressor in a heat exchanger cooled by air from said fan;

channeling cooled air from said heat exchanger to an ACC mount in said HP turbine supporting a row of turbine shrouds around turbine blades; and channeling spent air from said mount to internal cooling channels inside said blades in one of plural selective different modes of active clearance control.

22. A method according to claim 21 further comprising bypassing said hot compressor discharge air around said heat exchanger directly to said mount.

23. A method according to claim 22 further comprising bypassing said cooled air from said heat exchanger around said mount directly to said blades.

24. A method according to claim 23 further comprising correspondingly adjusting flow of said air from said heat exchanger to said mount, and from said heat exchanger bypassing said mount, and from said compressor bypassing said heat exchanger in three different modes of operation including active clearance control on and off.

* * * * *